(12) United States Patent
Shpigelman

(10) Patent No.: US 11,267,057 B2
(45) Date of Patent: **\*Mar. 8, 2022**

(54) END MILL HAVING TEETH AND ASSOCIATED FLUTES WITH CORRELATED PHYSICAL PARAMETERS

(71) Applicant: Iscar, Ltd., Tefen (IL)

(72) Inventor: Leonid Shpigelman, Carmiel (IL)

(73) Assignee: Iscar, Ltd., Tefen (IL)

( * ) Notice: Subject to any disclaimer, the term of this patent is extended or adjusted under 35 U.S.C. 154(b) by 49 days.

This patent is subject to a terminal disclaimer.

(21) Appl. No.: 16/810,351

(22) Filed: Mar. 5, 2020

(65) Prior Publication Data
US 2020/0198026 A1 Jun. 25, 2020

Related U.S. Application Data

(63) Continuation of application No. 15/861,821, filed on Jan. 4, 2018, now Pat. No. 10,618,122, which is a
(Continued)

(51) Int. Cl.
*B23C 5/10* (2006.01)

(52) U.S. Cl.
CPC ........ *B23C 5/10* (2013.01); *B23C 2210/0457* (2013.01); *B23C 2210/0492* (2013.01); *B23C 2210/204* (2013.01); *B23C 2210/206* (2013.01); *B23C 2210/282* (2013.01); *B23C 2210/325* (2013.01); *B23C 2210/405* (2013.01); *B23C 2210/54* (2013.01); *B23C 2220/28* (2013.01); *B23C 2250/16* (2013.01)

(58) Field of Classification Search
CPC .... B23C 2210/0492; B23C 2210/0457; B23C 2210/0414; B23C 2210/204; B23C 2210/206; B23C 2210/282; B23C 2210/325; B23C 2210/405; B23C 2210/54; B23C 2220/28
See application file for complete search history.

(56) References Cited

U.S. PATENT DOCUMENTS

| 1,840,852 A | 1/1932 | Schotthoefer |
| 3,133,339 A | 5/1964 | Ribich |
| (Continued) | | |

FOREIGN PATENT DOCUMENTS

| JP | 2006 110683 A | 4/2006 |
| JP | 2013-248727 | 12/2013 |

OTHER PUBLICATIONS

International Search Report dated Oct. 25, 2016, issued in PCT counterpart application (No. PCT/IL2016/050811).
(Continued)

*Primary Examiner* — Alan Snyder
(74) *Attorney, Agent, or Firm* — Womble Bond Dickinson (US) LLP

(57) ABSTRACT

An end mill includes a plurality of teeth and flutes. The teeth and their associated flutes include one or more correlated physical parameters. One such correlated parameter is that, at an axial location in a front half of an effective cutting length, at least one tooth of the plurality of teeth has a rake angle smaller than an average rake angle value of the plurality of teeth, and, at the same axial location, a flute preceding each such tooth has a helix angle larger than an average helix angle value of the plurality of flutes.

28 Claims, 3 Drawing Sheets

Related U.S. Application Data continuation of application No. 14/880,440, filed on Oct. 12, 2015, now Pat. No. 10,040,136.

(56) References Cited

U.S. PATENT DOCUMENTS

| | | | |
|---|---|---|---|
| 3,775,819 A | 12/1973 | Ribich | |
| 4,212,568 A | 7/1980 | Minicozzi | |
| 4,560,308 A | 12/1985 | Deller | |
| 4,662,803 A | 5/1987 | Arnold | |
| 5,779,399 A | 7/1998 | Kuberski | |
| 5,947,659 A | 9/1999 | Mays | |
| 6,056,485 A | 5/2000 | Magill et al. | |
| 6,164,876 A | 12/2000 | Cordovano | |
| 6,899,494 B2 | 5/2005 | Walrath | |
| 6,991,409 B2 * | 1/2006 | Noland | B23C 5/10 407/63 |
| 6,997,651 B2 | 2/2006 | Kawai et al. | |
| 7,001,113 B2 | 2/2006 | Flynn et al. | |
| 7,306,408 B2 | 12/2007 | Wells et al. | |
| 7,997,834 B2 | 8/2011 | Aoki et al. | |
| 8,221,036 B2 | 7/2012 | Volokh et al. | |
| 8,647,025 B2 | 2/2014 | Davis et al. | |
| 9,346,109 B2 | 5/2016 | Xu et al. | |
| 9,481,041 B2 | 11/2016 | Davis et al. | |
| 10,040,136 B2 | 8/2018 | Shpigelman | |
| 2002/0031409 A1 | 3/2002 | Sato et al. | |
| 2004/0120777 A1 | 6/2004 | Noland | |
| 2005/0105973 A1 | 5/2005 | MacArthur | |
| 2007/0122241 A1 | 5/2007 | Sichi et al. | |
| 2007/0154272 A1 | 7/2007 | Wells et al. | |
| 2013/0108382 A1 * | 5/2013 | Haraguchi | B23C 5/10 407/54 |
| 2013/0170916 A1 | 7/2013 | Xu et al. | |
| 2014/0119844 A1 | 5/2014 | Osawa et al. | |
| 2014/0161546 A1 | 6/2014 | Shpigelman et al. | |
| 2014/0227049 A1 | 8/2014 | Budda et al. | |
| 2014/0227050 A1 | 8/2014 | Budda et al. | |
| 2016/0074947 A1 | 3/2016 | Shpigelman | |

OTHER PUBLICATIONS

Written Opinion dated Oct. 25, 2016, issued in PCT counterpart application (No. PCT/IL2016/050811).

Japanese Office Action dated Aug. 5, 2020, in counterpart application (No. 2018-510073), including translation.

* cited by examiner

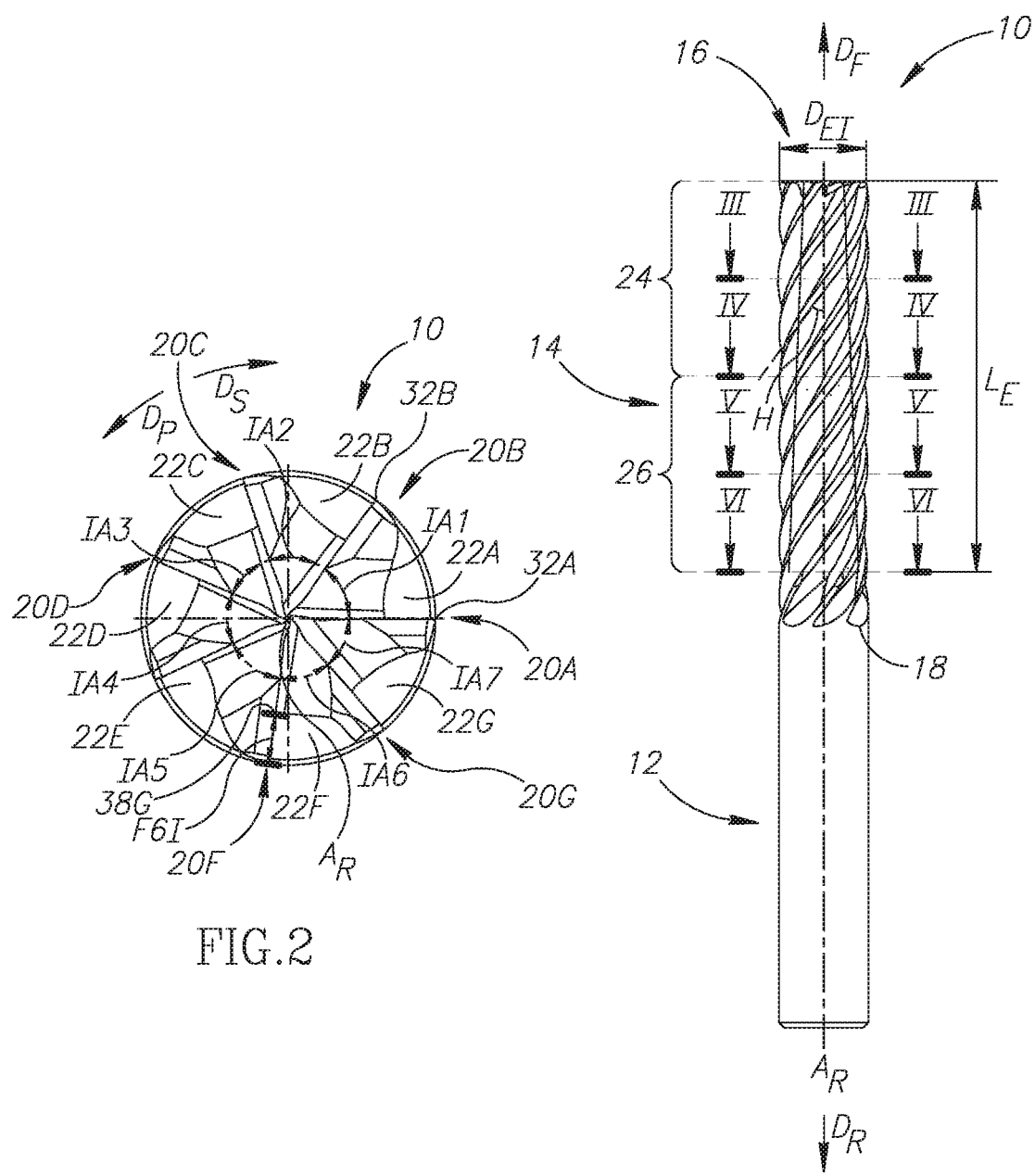

END MILL HAVING TEETH AND ASSOCIATED FLUTES WITH CORRELATED PHYSICAL PARAMETERS

RELATED APPLICATIONS

This is a Continuation of U.S. patent application Ser. No. 15/861,821, filed Jan. 4, 2018, now U.S. Pat. No. 10,618,122, which is a Continuation of U.S. patent application Ser. No. 14/880,440, filed Oct. 12, 2015, now U.S. Pat. No. 10,040,136. The contents of the above-mentioned applications are incorporated by reference, in their entirety.

FIELD OF THE INVENTION

The subject matter of the present application relates to an end mill configured for deep shouldering milling, and particularly a deep shouldering end mill capable of providing good quality surface finish on high hardness materials. The subject matter is particularly directed to such end mills having teeth and associated flutes with correlated physical parameters.

BACKGROUND OF THE INVENTION

End mills designed for shouldering applications, i.e. milling around an external periphery of a workpiece, typically have a maximum effective cutting length of twice the diameter of the end mill (hereinafter "2D"; with similar length dimensions being represented similarly, e.g. two and a half times the diameter will be written as "2.5D" etc.). Unless stated to the contrary, references to end mill diameter in the specification and claims refer to a diameter of the cutting portion at the cutting end face.

While in theory end mills can have any effective cutting length, in practice it is exceedingly rare to find end mills that can mill effectively at a depth greater than 2D. This is because increasing depth exacerbates vibration of the end mill reducing both work piece surface finish and end mill tool life to standards lower than those accepted by industry. To elaborate, end mills bend during shouldering, since the end mill is only held at one end thereof and the other end thereof is forced against and impacts a rigidly held workpiece. Such impacts also cause a rebound type effect, with this effect being comparatively greater with increased end mill length.

Similarly, this effect is also more severe when milling comparatively harder workpiece materials since the milling forces exerted on the end mill are greater with each impact on the hard workpiece.

Another problem which is exacerbated with increased depth of milling is chip evacuation. To elaborate, large flute depth is most critical near the cutting end face since each chip is first contacted by the tooth starting near the cutting end face as it first enters the material. The chip remains within the flute near the cutting end face for comparatively more time than the remainder of the flute, since it only exits the flute when the end mill has rotated fully in the work piece and the flute exits the workpiece allowing the chip to be ejected. While not being bound by theory, if the flute is insufficiently sized to contain the chip, abutment of the chip (which protrudes from the insufficiently sized flute) against the end mill and workpiece can increase vibration and even cause end mill breakage. It will be understood that with increased distance from the secured shank portion of the end mill this effect will be more significant.

Due to the high performance requirements in today's industry, what was once considered insignificant changes to end mill design are now able to define whether an end mill is acceptable to industry standards of surface finish and chip removal or not. While any end mill can theoretically machine any material, only by providing a competitive tool life for a given material removal rate and a desired level of surface finish can an end mill actually be considered relevant for a particular application.

SUMMARY OF THE INVENTION

In order to produce an end mill capable of deep shouldering milling (i.e. at a depth of at least 2.5D) while still providing good quality surface finish on high hardness materials, a number of vibration reduction features have been incorporated into a single end mill. Each inventive feature both alone and in combination is believed to significantly contribute to vibration reduction and consequently increase tool life and surface finish achieved.

In accordance with a first aspect of the subject matter of the present application, there is provided a finish end mill comprising a plurality of teeth and flutes; wherein at an axial location in a front half of the effective cutting length, at least one tooth of the plurality of teeth has a radial rake angle smaller than an average radial rake angle value and a flute preceding each such tooth (i.e. each of said at least one tooth) has a helix angle larger than an average helix angle value of the plurality of flutes.

This geometry is believed to reduce vibration by providing teeth with different radial rake angles while compensating at least one tooth having a relatively smaller radial rake angle with a relatively larger helix angle, the larger helix angle decreasing radial cutting force needed.

Stated differently, in accordance with a second aspect of the subject matter of the present application, there is provided a finish end mill configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising: a shank portion; and a cutting portion extending forward from the shank portion to a cutting end face; the cutting portion comprising: an effective cutting length ($L_E$); a diameter ($D_E$); a plurality of integrally formed teeth; and a plurality of flutes alternating with the plurality of teeth, each flute having a helix angle and a flute depth; each tooth comprising: a rake surface; a relief surface succeeding the rake surface and having a relief surface width measurable in a plane perpendicular to the rotation axis ($A_R$); a cutting edge formed at an intersection of the rake and relief surfaces; a relief edge spaced apart from the cutting edge and formed at an intersection of the relief surface and a flute surface of the flute succeeding the tooth; and a tooth area defined between a first radial line extending from the cutting edge to the central rotation axis and a second radial line extending from the central rotation axis to a nadir of the succeeding flute; wherein at an axial location in a front half of the effective cutting length: the flutes have an average helix angle value, with one or more flutes having a smallest helix angle value, and one or more flutes having a largest helix angle value; the teeth have an average radial rake angle value, with one or more teeth having a smallest radial rake angle value, and one or more teeth having a largest radial rake angle value; and, at least one tooth has a radial rake angle smaller than the average radial rake angle value and the flute preceding each such tooth has a helix angle larger than the average helix angle value.

In the first and second aspects, since the at least one tooth's radial rake angle is smaller than an average radial rake angle at the same axial location, and its associated flute's helix angle is larger than an average helix angle at the same axial location, the tooth's radial rake angle can be considered to be negatively correlated with its associated flute's helix angle.

In accordance with still another (third) aspect of the subject matter of the present application, there is provided a finish end mill comprising a plurality of teeth and flutes: wherein at an axial location in a front half of the effective cutting length, at least one tooth of the plurality of teeth has a tooth area greater than an average tooth area value of the plurality of teeth and a relief surface width smaller than an average relief surface width value.

This geometry is believed to reduce vibration by providing different geometry teeth, while compensating structural weakness of a tooth with a smaller relief surface width by only reducing the width of teeth with a comparatively larger tooth area.

This geometry also allows an end mill to be provided with a comparatively larger flute, i.e. the flute preceding said tooth with a comparatively smaller relief surface, which is also believed to reduce vibration by allowing more chip evacuation area as explained above.

Stated differently, in accordance with yet another (fourth) aspect of the subject matter of the present application, there is provided a finish end mill configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising: a shank portion; and a cutting portion extending forward from the shank portion to a cutting end face; the cutting portion comprising: an effective cutting length ($L_E$); a diameter ($D_E$); a plurality of integrally formed teeth; and a plurality of flutes alternating with the plurality of teeth, each flute having a helix angle and a flute depth; each tooth comprising: a rake surface; a relief surface succeeding the rake surface and having a relief surface width measurable in a plane perpendicular to the rotation axis ($A_R$); a cutting edge formed at an intersection of the rake and relief surfaces; a relief edge spaced apart from the cutting edge and formed at an intersection of the relief surface and a flute surface of the flute succeeding the tooth; and a tooth area defined between a first radial line extending from the cutting edge to the central rotation axis and a second radial line extending from the central rotation axis to a nadir of the succeeding flute; wherein at an axial location in a front half of the effective cutting length: the teeth have an average tooth area value, with one or more teeth having a smallest tooth area value, and one or more teeth having a largest tooth area value; the teeth have an average relief surface width value, with one or more teeth having a smallest relief surface width value, and one or more teeth having a largest relief surface width value; and, at least one tooth has a tooth area greater than the average tooth area value and a relief surface width smaller than the average relief surface width value.

Notably, application of the inventive features of the aspects above are located at an axial location in a front half of the effective cutting length (i.e. a half of the effective cutting length which is distal from a shank of the endmill) since the problem of vibration is more significant with increased distance from a securely held shank of the end mill. It will be understood that their effectiveness is greater with increasing distance from the shank (i.e. with increasing proximity to the cutting end face). Nonetheless this is not to say that there would not be any effect in a proximal half of the effective cutting length to the shank.

In the third and fourth aspects, since the at least one tooth's tooth area has a larger than average tooth area value and its associated relief surface has a lower than average relief surface width value, the tooth's tooth area can be considered to be negatively correlated with its associated relief surface's relief surface width.

In accordance with still a further (fifth) aspect of the subject matter of the present application, there is provided a finish end mill comprising a shank and a cutting portion; the cutting portion having an effective cutting length greater than $2.5D_E$ and comprising a plurality of teeth and flutes; the plurality of teeth comprising at least two teeth having different radial rake angles, at least some of the different radial rake angle values being different from all other non-identical values by 2° or more; and, each flute of the plurality of flutes have an increasing depth with increasing distance from the shank.

On the one hand this geometry provides an atypically long effective cutting length while compensating for greater vibration associated with increased cutting length by combining an enlarged flute depth distant from the shank with significantly different rake angles to reduce vibration during milling.

In comparatively shorter end mills on the market, different rake angles are often not cost effective due to their relatively small contribution in reducing vibration, at least in comparison to other vibration reduction design options. However, with longer end mills, and even more so longer end mills with a large number of teeth (e.g. 5 or more teeth, and all the more so as the number of teeth increases), it has been found that providing different and particularly significantly varying the radial rake angles achieves a comparatively notable vibration reduction effect, thereby justifying the added design complexity and expense of providing different radial rake angles.

Stated differently, in accordance with yet another (sixth) aspect of the subject matter of the present application, there is provided a finish end mill configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising: a shank portion; and a cutting portion extending forward from the shank portion to a cutting end face; the cutting portion comprising: an effective cutting length ($L_E$); a diameter ($D_E$); a plurality of integrally formed teeth; and a plurality of flutes alternating with the plurality of teeth, each flute having a helix angle and a flute depth; each tooth comprising: a rake surface; a relief surface succeeding the rake surface and having a relief surface width measurable in a plane perpendicular to the rotation axis ($A_R$); a cutting edge formed at an intersection of the rake and relief surfaces; a relief edge spaced apart from the cutting edge and formed at an intersection of the relief surface and a flute surface of the flute succeeding the tooth; and a tooth area defined between a first radial line extending from the cutting edge to the central rotation axis and a second radial line extending from the central rotation axis to a nadir of the succeeding flute; wherein at an axial location in a front half of the effective cutting length: the teeth have an average radial rake angle value, with one or more teeth having a smallest radial rake angle value, and one or more teeth having a largest radial rake angle value; wherein: the cutting portion has an effective cutting length greater than 2.5D; at least some of the teeth with different radial rake angle values have values different from all other non-identical values by 2° or more; and each flute of the plurality of flutes has an increasing depth with increasing distance from the shank.

In the fifth and sixth aspects, a relatively large effective cutting length and relatively large difference between the radial rake angle values can be considered to be a positive correlation.

In accordance with a further (seventh) aspect of the subject matter of the present application, there is provided a finish end mill comprising a shank and a cutting portion; the cutting portion comprising a plurality of teeth and flutes; the plurality of teeth comprising at least three teeth having different radial rake angles, at least some of the different radial rake angle values being different from all other non-identical values by 2° or more; and the plurality of flutes having a helix variance of 6° or less.

On the one hand this geometry provides significantly different radial rake angles to reduce vibration during milling, compensating for the very moderate helix angle variance (e.g. a helix angle variance of 6° or less). A large helix angle variance is believed to be a more effective design option than varying rake angles, for vibration reduction. Some applications where the disadvantage of moderate helix angle variation may be beneficial are for particularly for comparatively long end mills (e.g. having an effective cutting length of at least 2.5D) and/or end mills with a comparatively large number of teeth (e.g. 5 or more teeth).

Stated differently, in accordance with yet another (eighth) aspect of the subject matter of the present application, there is provided a finish end mill configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising: a shank portion; and a cutting portion extending forward from the shank portion to a cutting end face; the cutting portion comprising: an effective cutting length ($L_E$); a diameter ($D_E$); a plurality of integrally formed teeth; and a plurality of flutes alternating with the plurality of teeth, each flute having a helix angle and a flute depth; each tooth comprising: a rake surface; a relief surface succeeding the rake surface and having a relief surface width measurable in a plane perpendicular to the rotation axis ($A_R$); a cutting edge formed at an intersection of the rake and relief surfaces; a relief edge spaced apart from the cutting edge and formed at an intersection of the relief surface and a flute surface of the flute succeeding the tooth; and a tooth area defined between a first radial line extending from the cutting edge to the central rotation axis and a second radial line extending from the central rotation axis to a nadir of the succeeding flute; wherein at an axial location in a front half of the effective cutting length: the flutes have an average helix angle value, with one or more flutes having a smallest helix angle value, and one or more flutes having a largest helix angle value; the teeth have an average radial rake angle value, with one or more teeth having a smallest radial rake angle value, and one or more teeth having a largest radial rake angle value; wherein, at an axial location in a front half of the effective cutting length: at least three teeth having different radial rake angles, at least some of the different radial rake angle values being different from all other non-identical values by 2° or more, and the flutes having a helix variance of 6° or less.

In the seventh and eighth aspects, since relatively large difference between the radial rake angle values and a relatively small variance of the helix angles can be considered to be a negative correlation.

It should be understood that the term "negative correlation" in the specification and claims should not be interpreted with a strict mathematical definition that as one variable increases the other correspondingly decreases, but rather should be understood in view of the disclosure and claims of the application, which generally describe this concept in connection with a physical object, specifically an end mill. A corresponding understanding should be similarly applied to any "positive correlation" in the specification and claims.

It will further be understood that the aspects, except where stated explicitly, may also be beneficial for end mills of effective cutting length smaller than 2.5D.

Similarly, while the end mill according to the invention has been designed for finish applications, and primarily tested on high hardness materials, it should be understood that it is believed that such end mill features, according to any of the aspects, may also be found to be highly effective for applications other than finish and even for machining less hard workpiece materials.

According to yet another (ninth) aspect, there is provided a finish end mill for configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill can comprise: a shank portion; and a cutting portion extending forward from the shank portion to a cutting end face; the cutting portion comprising: an effective cutting length ($L_E$); a diameter ($D_E$); a plurality of integrally formed teeth; and a plurality of flutes alternating with the plurality of teeth, each flute having a helix angle and a flute depth; each tooth comprising: a rake surface; a relief surface succeeding the rake surface and having a relief surface width measurable in a plane perpendicular to the rotation axis ($A_R$); a cutting edge formed at an intersection of the rake and relief surfaces; a relief edge spaced apart from the cutting edge and formed at an intersection of the relief surface and a flute surface of the flute succeeding the tooth; and a tooth area defined between a first radial line extending from the cutting edge to the central rotation axis and a second radial line extending from the central rotation axis to a nadir of the succeeding flute; wherein at an axial location in a front half of the effective cutting length: the flutes have an average helix angle value, with one or more flutes having a smallest helix angle value, and one or more flutes having a largest helix angle value; the teeth have an average radial rake angle value, with one or more teeth having a smallest radial rake angle value, and one or more teeth having a largest radial rake angle value; the teeth have an average tooth area value, with one or more teeth having a smallest tooth area value, and one or more teeth having a largest tooth area value; and the teeth have an average relief surface width value, with one or more teeth having a smallest relief surface width value, and one or more teeth having a largest relief surface width value.

It will also be understood that the above-said is a summary, and that any of the aspects above may further comprise any of the features described hereinbelow. Specifically, the following features, either alone or in combination, may be applicable to any of the above aspects:

A. At an axial position in at least in the front half of the effective cutting length, the flutes can have an average helix angle value, with one or more flutes having a smallest helix angle value, and one or more flutes having a largest helix angle value.

B. At an axial position in at least in the front half of the effective cutting length, the teeth can have an average radial rake angle value, with one or more teeth having a smallest radial rake angle value, and one or more teeth having a largest radial rake angle value.

C. At an axial position in at least in the front half of the effective cutting length, the teeth can have an average tooth area value, with one or more teeth having a smallest tooth area value, and one or more teeth having a largest tooth area value.

D. At an axial position in at least in the front half of the effective cutting length, the teeth can have an average relief surface width value, with one or more teeth having a smallest relief surface width value, and one or more teeth having a largest relief surface width value.

E. An end mill can be configured for milling high hardness materials (e.g. materials with a hardness of 38-65 HRc). For example, some notable materials of this type can be those known as D2, H13 and P20.

F. An end mill can be configured for rotating about a central rotation axis ($A_R$).

G. A central rotation axis ($A_R$) can define opposite axially forward and rearward directions ($D_F$, $D_R$), and opposite rotational preceding and succeeding directions ($D_P$, $D_S$), the preceding direction ($D_P$) being the cutting direction. It will be understood that a "front half" of an effective cutting length is one which is further in the forward direction than the remaining half. Stated differently, the "front half" is a half distal from a shank.

H. An end mill can comprise a shank portion and a cutting portion extending forward from the shank portion to a cutting end face.

I. An end mill, or more precisely a cutting portion of an end mill can comprise an effective cutting length ($L_E$), a diameter ($D_E$), a plurality of integrally formed teeth, and a plurality of flutes alternating with the plurality of teeth, each of the flutes having a helix angle and a flute depth. To clarify, the flutes may have variable helix angles which change at different axial locations, nonetheless at each axial location such as those shown in FIGS. 3 to 6, there is a helix angle value. Additionally, the diameter $D_E$ may differ at different axial locations (denoted herein as $D_{EI}$, $D_{EII}$ . . . etc.).

J. A tooth can comprise: a rake surface; a relief surface succeeding the rake surface and having a relief surface width measurable in a plane perpendicular to the rotation axis ($A_R$); a cutting edge formed at an intersection of the rake and relief surfaces; a relief edge spaced apart from the cutting edge and formed at an intersection of the relief surface and a flute surface of the flute succeeding the tooth; and a tooth area defined between a first radial line extending from the cutting edge to the central rotation axis and a second radial line extending from the central rotation axis to a nadir of the succeeding flute.

K. At an axial location in a front half of an effective cutting length: at least one tooth, can have a radial rake angle smaller than an average radial rake angle value of a plurality of teeth of an end mill; and a flute preceding each at least one tooth can have a helix angle larger than an average helix angle value of a plurality of flutes of the end mill. Preferably at least two teeth can have a radial rake angle smaller than an average radial rake angle value of a plurality of teeth of an end mill; and a flute preceding each tooth of the at least one tooth can have a helix angle larger than an average helix angle value of a plurality of flutes of the end mill. More preferably, the helix angle can be equal to a largest value of a helix angle range of the plurality of flutes. Similarly, it is preferable, that the radial rake angle can be equal to a smallest radial rake angle value of the plurality of teeth. Most preferably all teeth with a radial rake angle equal to a smallest radial rake angle value of the plurality of teeth can be preceded by a flute with a helix angle larger than an average helix angle value of the plurality of flutes, preferably a largest helix angle value of the plurality of flutes. Preferably, each flute of a majority of flutes having a helix angle larger than an average helix angle value of the plurality of flutes, are succeeded by a tooth having a radial rake angle smaller than an average rake angle value of the plurality of teeth.

L. At an axial location in a front half of an effective cutting length, at least one tooth of the plurality of teeth can have: a radial rake angle which is equal to a largest radial rake angle range of a plurality of teeth; and a flute preceding each at least one tooth can have a helix angle which is smaller than a largest helix angle and larger than a smallest helix angle, of a plurality of flutes.

M. At an axial location in a front half of an effective cutting length: at least one tooth of the plurality of teeth can have a radial rake angle greater than an average radial rake angle value of a plurality of teeth of an end mill; and a flute preceding each tooth of the at least one tooth can have a helix angle smaller than an average helix angle value of a plurality of flutes of the end mill.

N. A plurality of teeth can include at least two, preferably three, and most preferably a majority of, teeth having different radial rake angles. At least some, and preferably a majority, of the different radial rake angle values being different from all other non-identical values by 2° or more. Preferably each radial rake angle value is different from all other non-identical values in accordance with the condition: 3°±1°.

O. A plurality of flutes can have a helix variance of 6° or less. To clarify, this means that the largest helix angle value and smallest helix angle value of all of the plurality of flutes differ by 6° or less. Preferably, all helix angles of an end mill can be within the range of 35° to 41°. Most preferably, the helix variance is 4° or less.

P. Successive flutes can have different helix angles which vary by 3° or less, preferably 2° or less.

Q. Each of the plurality of flutes can have an increasing depth with increasing distance from a shank. A flute depth at a rear end of the end mill can preferably be between 10% to 14% of the diameter ($D_{EV}$). A flute depth at a front end of the end mill can preferably be between 16% to 20% the diameter ($D_{EI}$).

R. At an axial location in a front half of an effective cutting length at least one tooth, preferably at least two teeth, of a plurality of teeth can have a tooth area greater than an average tooth area of the plurality of teeth, and a relief surface width smaller than an average relief surface width value of the plurality of teeth. However, it may be preferable that at most only a minority of teeth of the plurality of teeth have a tooth area greater than an average tooth area of the plurality of teeth, and a relief surface width smaller than an average relief surface width value of the plurality of teeth.

S. An axial location within a front half of the effective cutting length can preferably be within a front third of the effective cutting length.

T. A cutting portion can have an effective cutting length equal to or greater than $2.5D_E$. Preferably the effective cutting length is less than $6D_E$. Most preferably the effective cutting length fulfills the condition ($4D_E \pm 1D_E$) with values approaching $4D_E$ being most preferred.

U. In a rearward direction from a cutting end face, index angles between each adjacent pair of cutting edges in cross-sections of the cutting portion can approach equality and subsequently diverge therefrom. Preferably said index angles can approach equality with increasing proximity to a middle of the effective cutting length.

V. Index angles at a front end of an end mill can correspond to index angles at a rear end of the effective cutting length. A majority of index angles at a front end of the end mill can be unequal.

W. A diameter $D_E$ of the end mill can be a constant value throughout the effective cutting length (ignoring differences smaller than about 30 microns). Preferably, the end mill diameter can be largest at the end face and reduce in diameter with increasing proximity to the shank and amount less than 30 micron. When interpreting the claims, the diameter to be considered should be the one at the axial location specified or, if not specified, the diameter at the end face.

X. A plurality of teeth is preferably equal to or greater than five teeth. For the applications described above, a high number of teeth, is at least five. However, increasing the number of teeth reduces available flute space. According the plurality of teeth is preferably equal to or less than 11 teeth. Most preferably the plurality of teeth is equal to 5, 7 or 9 teeth, with 7 teeth being considered the most preferred number of teeth taking into account flute space. Preferably the plurality of teeth is an odd number of teeth for reducing vibration due to non-symmetry.

Y. All teeth of a plurality of teeth can all be smooth (i.e. non-serrated). This can allow better workpiece surface finish. By "serrated" it is meant that multiple peak-crest shapes (although not necessarily strictly sinusoidal in shape) are formed adjacent to each other on the tooth. Accordingly, a "smooth" tooth in accordance with the present specification and claims may still have a single peak-crest-peak shape (or even a few significantly spaced from each other, e.g. at a distance greater than a quarter of the effective cutting length) which functions as a chip breaker and not for rough cutting which is the purpose of a serrated tooth. This is because an occasional chip breaker may still allow good surface finish, even though a smooth tooth without any chip breaker may provide a slightly better surface finish and may be preferred for some applications.

BRIEF DESCRIPTION OF THE DRAWINGS

For a better understanding of the subject matter of the present application, and to show how the same may be carried out in practice, reference will now be made to the accompanying drawings, in which:

FIG. 1 is a side view of an end mill according to the subject matter of the present application;

FIG. 2 is a view of a cutting end face of the end mill in FIG. 1, along a rotation axis $A_R$, i.e. at a front end of the end mill;

DETAILED DESCRIPTION

Figure 3:
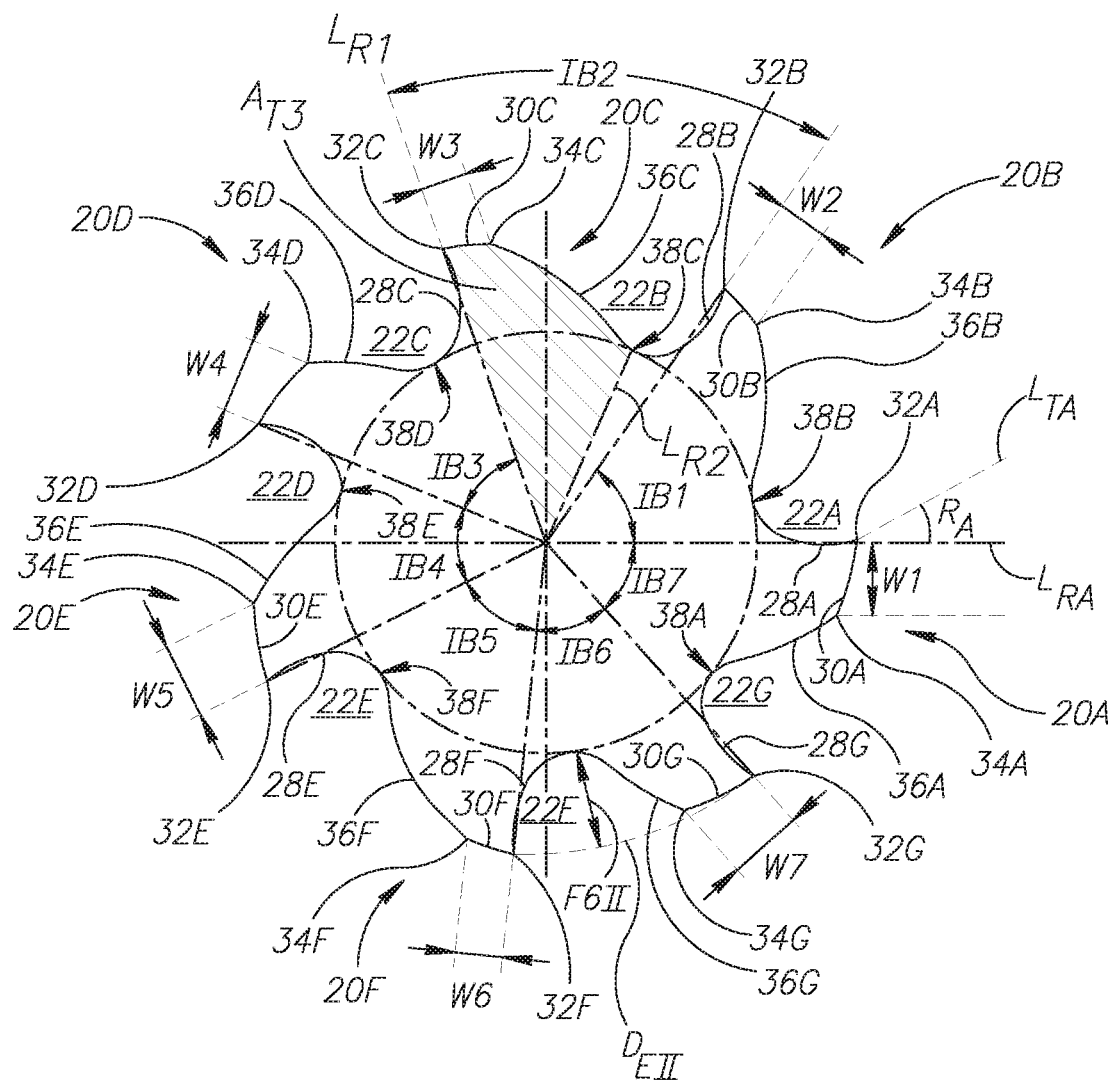
FIG. 3 is a cross-section view taken along line in FIG. 1, corresponding to an axial location at a front quarter of the effective cutting length of the cutting portion.

FIGS. 1 and 2 illustrate an end mill 10, typically made of extremely hard and wear-resistant material such as cemented carbide, configured for rotating about a central rotation axis $A_R$ which extends longitudinally through the center thereof.

The central rotation axis $A_R$ defines opposite axially forward and rearward directions $D_F$, $D_R$, and opposite rotational preceding and succeeding directions $D_P$, $D_S$, the preceding direction $D_P$ being the cutting direction.

The end mill 10 comprises a shank portion 12 and a cutting portion 14 extending in the forward direction $D_F$ therefrom.

The cutting portion 14 extends in the rearward direction $D_R$ from a cutting end face 16 to a furthermost flute end 18.

The cutting portion 14 is integrally formed with first, second, third, fourth, fifth, sixth and seventh teeth 20A, 20B, 20C, 20D, 20E, 20F, 20G alternated with helically shaped first, second, third, fourth, fifth, sixth and seventh flutes 22A, 22B, 22C, 22D, 22E, 22F, 22G.

To explain relative terminology used herein, for example, the first flute 22A is adjacent to the first tooth 20A in the preceding direction ($D_P$), and could therefore be described as the flute which precedes the first tooth 20A. Another example would be that the seventh flute 22G succeeds the first tooth 20A, or, alternatively stated, that the first tooth 20A precedes the seventh flute 22G, etc.

Shown in FIG. 1, each flute 22 has a helix angle H formed with the central rotation axis $A_R$. It is understood that the helix angles of the various flutes need not be the same, and that the helix angle of any given flute may not be constant for its entire length along the effective cutting length $L_E$.

An effective cutting length $L_E$ of the cutting portion 14 extends from the cutting end face 16 to an axial location where tooth relief surfaces are no longer effective, which is visible in this example at the axial location designated with the reference character "29" (in this example the axial location of the end of the effective cutting length $L_E$ coincides with section VI-VI).

The outer edge of the cutting portion 14 is substantially cylindrical. More precisely, noting this is a preference, the diameter $D_E$ of the end mill, when magnified to a magnitude of microns, is greater at the cutting end face 16 than at locations closer to the shank 12. Stated differently, the diameter $D_E$ decreases with increasing proximity to the shank 12. Thus $D_{EI}$ is larger than $D_{EII}$, which in turn is larger than $D_{EIII}$, which in turn is larger than $D_{EIV}$, which in turn is larger than $D_{EV}$. Also, in some embodiments, the cutting teeth 20A, 20B, 20C, 20D, 20E, 20F, 20G can all extend equally radially outwardly to establish the diameter $D_E$.

As shown from the unbroken appearance of the teeth 20 in FIG. 1, the teeth 20 are non-serrated.

In FIG. 2, first, second, third, fourth, fifth, sixth and seventh index angles IA1, IA2, IA3, IA4, IA5, IA6, IA7 are shown.

Referring to FIG. 1, aside from the cutting end face 16, i.e. the front of the effective cutting length $L_E$, and section VI-VI at the rear end of the effective cutting length $L_E$, intermediary axial locations or sections (or views of a plane perpendicular to the central rotation axis $A_R$) have been chosen for explanatory purposes. For example: section corresponds to an axial location or section rearward of the cutting end face 16 by a quarter of the effective cutting length $L_E$; section IV-IV corresponds to an axial location or section rearward of section by a quarter of the effective cutting length $L_E$ and therefore represents the middle of the effective cutting length $L_E$; section V-V corresponding to an axial location or section rearward of section IV-IV by a quarter of the effective cutting length $L_E$; and section VI-VI is an axial location or section rearward of section V-V by a quarter of the effective cutting length $L_E$. Accordingly, a front half 24 of the effective cutting length $L_E$ is from the section IV-IV to the cutting end face 16, and a rear half 26 of the effective cutting length $L_E$ is from the section IV-IV to the section VI-VI.

Using FIG. 3 for ease of visibility, some further features are identified. Each tooth 20 comprises: first, second, third, fourth, fifth, sixth and seventh rake surfaces (28A, 28B, 28C, 28D, 28E, 28F, 28G); first, second, third, fourth, fifth, sixth and seventh relief surfaces (30A, 30B, 30C, 30D, 30E, 30F, 30G) succeeding each adjacent rake surface 28 and having first, second, third, fourth, fifth, sixth and seventh relief surface widths (W1, W2, W3, W4, W5, W6, W7); first, second, third, fourth, fifth, sixth and seventh cutting edges (32A, 32B, 32C, 32D, 32E, 32F, 32G) formed at respective intersections of the rake and relief surfaces 28, 30; first, second, third, fourth, fifth, sixth and seventh relief edges (34A, 34B, 34C, 34D, 34E, 34F, 34G) at a succeeding end of each relief surface 30; and first, second, third, fourth, fifth, sixth and seventh flute surfaces (36A, 36B, 36C, 36D, 36E, 36F, 36G) succeeding each relief edge (34A, 34B, 34C, 34D, 34E, 34F, 34G). Each flute surface 36 extends in the succeeding direction $D_S$ until it reaches an adjacent first, second, third, fourth, fifth, sixth or seventh nadir (38A, 38B, 38C, 38D, 38E, 38F, 38G).

To explain measurement of the relief surface widths W with a specific example, the first relief surface W1 is measured from the first cutting edge 32A to the relief edge 34A, the relief edge 34A in this example constituting a discontinuity point in a plane perpendicular to the rotation axis $A_R$. To elaborate a radial line is extended from the central rotation axis $A_R$ to the first cutting edge 32A and a second line parallel to the radial line is drawn intersecting the relief edge 34A, and the distance between the two lines is measured to provide the width. As shown, the first relief surface W1 is succeeded by the first flute surface 36A which has a different slope. It is understood that in cross-sections along the effective cutting length $L_E$, the relief surfaces 30 are recessed from the footprint of the cutting diameter $D_E$, except at the cutting edges 32. In a case where the relief surface 30 comprises a plurality of sub-relief surfaces (not shown) the relief edge (i.e. the discontinuity in a cross sectional view) which should be considered for width measurement is that which is closest to the nadir of the flute (and not the cutting edge).

Each tooth 20 comprises a tooth area $A_T$. The tooth area $A_T$ is defined between a first radial line $L_{R1}$ extending from the cutting edge 32 to the central rotation axis $A_R$ and a second radial line $L_{R2}$ extending from the central rotation axis $A_R$ to the nadir 38 succeeding the cutting edge 32. To explain with a specific example, a third tooth area $A_{T3}$, shown for ease of visibility with hatching, is defined between a first radial line $L_{R1}$ extending from the third cutting edge 32C to the central rotation axis $A_R$ and a second radial line $L_{R2}$ extending from the central rotation axis $A_R$ to the third nadir 38C succeeding the third cutting edge 32C.

In the present example, in the section view shown in FIG. 3, the teeth with the largest tooth areas are the second, third and sixth teeth (20B, 20C, 20F) (which could be visually appreciated by drawings radial lines on each one as explained with respect to the third tooth 20C in the preceding paragraph). Each of the second, third and sixth teeth (20B, 20C, 20F) have a tooth area $A_T$ greater than an average tooth area $A_\mu$ (not shown). An average tooth area $A_\mu$ can be calculated with the equation $A_\mu = \Sigma A_{Ti}/n$ (where Ti represents the value of a specific tooth area and n is the number of teeth).

The teeth 20 each have a radial rake angle R, measurable between a radial line extending from the central rotation axis $A_R$ to the cutting edge 32 and a tangent line $L_T$ extending tangentially from the associated rake surface 28. To explain with a specific example, the first radial rake angle $R_A$, is measurable between a first radial line $L_{RA}$ and a first tangent line $L_{TA}$ from the first rake surface 28A.

In the present example, in the section view shown in FIG. 3, the teeth with the smallest radial rake angles are the third and sixth teeth (20C, 20F). The teeth with the largest radial rake angles are the second, fourth and seventh teeth (20B, 20D, 20G). The teeth having radial rake angles larger than the smallest radial rake angles and smaller than the largest radial rakes angles are the first and fifth teeth (20A, 20E).

In this example, the third and sixth teeth (20C, 20F) have radial rake angles of 6°, the second, fourth and seventh teeth (20B, 20D, 20G) have radial rake angles of 12°, and the first and fifth teeth (20A, 20E) have radial rake angles of 9°. An average radial rake angle $R_\mu$ can be calculated with the equation $R_\mu = \Sigma R_i/n$ (where Ri represents the value of a specific radial rake angle and n is the number of teeth). In this example the average radial rake angle is calculated as follows: $R_\mu = (6+6+12+12+12+9+9)/7 = 9.43°$. Therefore, in this example, the second, fourth and seventh teeth (20B, 20D, 20G) have radial rake angles greater than the average radial rake angle and the remainder of teeth have radial rake angles smaller than the average radial rake angle.

In the present example, the flutes with the largest helix angles H are the third and sixth flutes (22C, 22F). The flutes with the smallest helix angles are the first and fifth flutes (22A, 22E). The flutes having helix angles larger than the smallest helix angles and smaller than the largest helix angles are the second, fourth and seventh flutes (22B, 22D, 22G). In this example, the third and sixth flutes (22C, 22F) have helix angles of 37°, the second, fourth and seventh flutes (22B, 22D, 22G) have helix angles of 36°, and the first and fifth flutes (22A, 22E) have helix angles of 35°. An average helix angle $H_\mu$ can be calculated with the equation $H_\mu = \Sigma H_i/n$ (where Hi represents the value of a specific helix angle and n is the number of teeth). In this example the average helix angle is calculated as follows: $H_\mu = (37+37+36+36+36+35+35)/7 = 36°$.

Therefore, in this example, the second, fourth and seventh flutes (22B, 22D, 22G) have helix angles equal to the average helix angle, the first and fifth flutes (22A, 22E) have helix angles smaller than the average helix angle, and the third and sixth flutes (22C, 22F) have helix angles larger than the average helix angle.

Since the third and sixth teeth have radial rake angles that are smaller than average and their associated third and sixth flutes have helix angles that are larger than average, the third and sixth teeth can be considered to have radial rake angles that are negatively correlated with their respective associated third and sixth flutes' helix angles.

Each flute 22 has a flute depth F. The flute depth F is measurable between the nadir 38 of the associated flute 22 and the diameter $D_E$ in the associated sectional view. The flute depth F can increase with increasing distance from the shank 12.

In the present example, referring to FIG. 2, a first flute depth F6I of the sixth flute 22F, is shown at the cutting end face 16, and at this axial location has a largest flute depth, when compared with locations closer to the shank 12. Notably, the first flute depth F6I is measured between the seventh nadir 38G (noting that the nadirs are numbered in common with the preceding tooth) and the diameter $D_E$. The different flute depths of the sixth flute 22F are exemplified in the remaining drawings. Each flute depth closer to the shank 12 has a relatively smaller magnitude than locations closer to the cutting end face 16. For example, the first flute depth F6I at the cutting end face 16 is deeper (i.e. greater in magnitude than a second flute depth F6II of the sixth flute 22F in FIG. 3. Similarly, the second flute depth F6II is deeper than a third flute depth F6III in FIG. 4, which in turn is deeper than a fourth flute depth F6IV in FIG. 5, which in turn is deeper than a fifth flute depth F6V in FIG. 6.

Reverting to FIG. 2, index angles are shown measurable between cutting edges 32. For example, a first index angle IA1 is measurable between the first cutting edge 32A and the second cutting edge 32B. Similarly, second, third, fourth, fifth, sixth and seventh index angles (IA2, IA3, IA4, IA5, IA6, IA7) are shown.

In the present example, the first index angle IA1 is equal to 57.4°, the second index angle IA2 is equal to 57.9°, the third index angle IA3 is equal to 45.3°, the fourth index angle IA4 is equal to 45°, the fifth index angle IA5 is equal to 63.9°, the sixth index angle IA6 is equal to 45.2°, and the seventh index angle IA7 is equal to 45.3°.

Reverting to FIG. 3, first, second, third, fourth, fifth, sixth and seventh index angles (IB1, IB2, IB3, IB4, IB5, IB6, IB7) also correspond to the first, second, third, fourth, fifth, sixth and seventh flutes (22A, 22B, 22C, 22D, 22E, 22F, 22G) but have different values to the first, second, third, fourth, fifth, sixth and seventh index angles (IA1, IA2, IA3, IA4, IA5, IA6, IA7) in FIG. 1 resulting from the unequal helix values.

Figure 4:
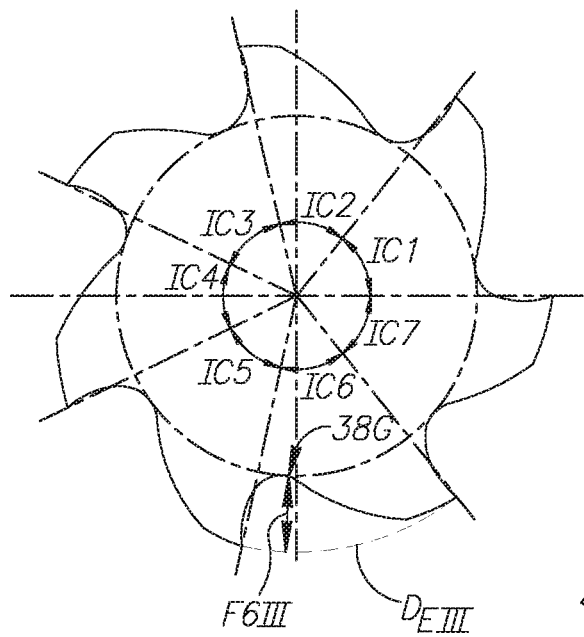
FIG. 4 is a cross-section view taken along line IV-IV in FIG. 1, corresponding to an axial location in the middle of the effective cutting length of the cutting portion.

Notably, the helix angles and index angles can be advantageously configured to approach equality (which in this case is 51.4°, i.e. 360° divided by the no. of teeth) at the middle of the effective cutting length. That is to say in FIG. 3 the index angles IB are closer to 51.4° than the index angles IA in FIG. 2, and the first, second, third, fourth, fifth, sixth and seventh index angles (IC1, IC2, IC3, IC4, IC5, IC6, IC7) in FIG. 4 are closer, or equal, to 51.4° than in FIG. 3.

Notably, the helix angles and index angles are configured to diverge from the equal or near equal values at the middle of the effective cutting length. That is to say in FIG. 5 the index angles (ID1, ID2, ID3, ID4, ID5, ID6, ID7) are further from the value 51.4° than the corresponding index angles IC in FIG. 4.

Figure 5:
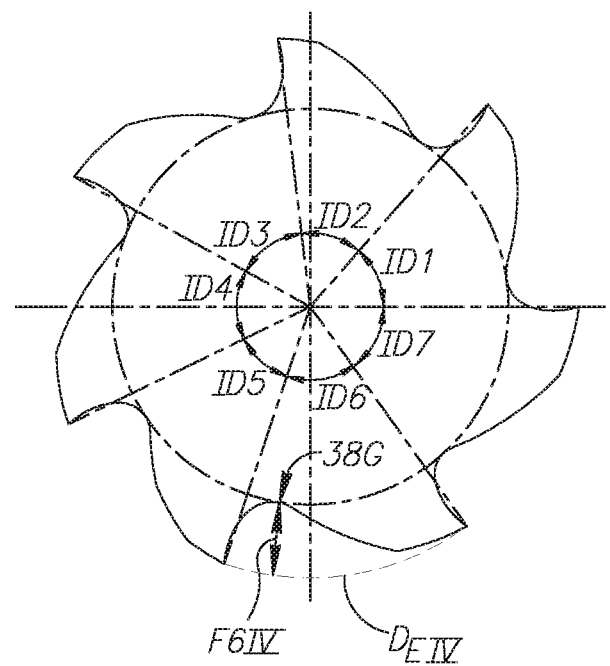
FIG. 5 is a cross-section view taken along line V-V in FIG. 1, corresponding to an axial location at a rear quarter of the effective cutting length of the cutting portion.
Figure 6:
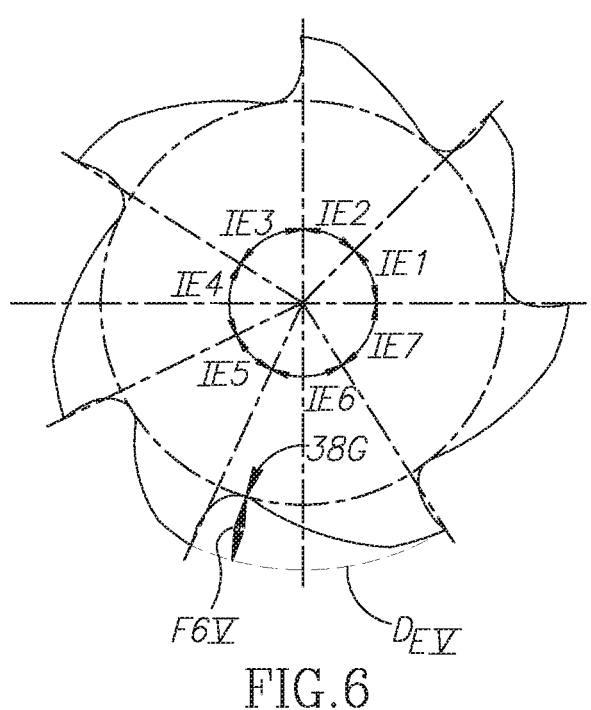
FIG. 6 is a cross-section view taken along line VI-VI in FIG. 1, corresponding to a rear axial location, i.e. a rear end, of the effective cutting length of the cutting portion.

The divergence of the index angles from equality can be approximately the same (at least in absolute magnitude) in FIGS. 3 and 5, and also in FIGS. 2 and 6.

Test results for the above-described end mill by far surpassed performance of comparative end mills tested (on steels having a hardness of 38-65 HRc, with a chip width of up to 10% of the end mill diameter, and at a depth of 4D). A level of surface finish acceptable according to industry standards for finish is Ra=0.4 μm, and Ra=0.3 μm was achieved even at a depth of 4D. Similarly, the end mill performed successfully under trochoidal milling conditions, and even on stainless steel. While testing has not yet been completed, successful testing was achieved even for chips of up to 25% of the end mill diameter. Thus far, all testing even for varied conditions and materials has been successful.

While each of the features undoubtedly contributed to improved performance, each of a number of specific improvements are believed to individually provide improved performance even for different application end mills.

For example, one design feature thought to particularly contribute to the end mill's performance is that at least one, and preferably each, of the third and sixth teeth (20C, 20F), which have a radial rake angle of 6° (i.e. a smaller radial rake angle value than the average radial rake angle of 9.43°, and preferably the smallest radial rake angle out of the rake angle set of 6°, 9° and 12°) are each preceded by a flute, i.e. third and sixth flutes 22C, 22F having a helix angle of 37° (i.e. a helix angle value larger than the average helix angle of 36°, and preferably the largest helix angle value out of the helix angle set of 35°, 36° and 37°).

It is also noted that the converse arrangement is not necessarily detrimental, i.e. a tooth with the largest radial rake angle (i.e. 12°, which reduces radial cutting force required) does not necessarily have to be associated with a preceding flute having the smallest helix angle (i.e. 35°) but can beneficially be associated with a preceding flute of a larger helix angle (i.e. 36°, requiring less radial cutting force than a helix angle of 35°).

Yet another design feature providing a notable independent contribution is the provision of radial rake angles with significantly different values. To offset a particularly long effective cutting length and increasing flute depth, the radial rake angles are different by 2° or more (and in this example by 3°). It is believed beneficial, however, for the radial rake angle values to not be overly different so as not to overly vary cutting forces on a particular tooth thereby increasing wear.

For explanative purposes it is noted that the exemplary radial rake angle set includes seven values, namely 6°, 6°, 12°, 12°, 12°, 9°, 9°. It is noted that one tooth having a radial rake angle value of 9° differs from the teeth having radial rake angles of 6° by 3°, and also differs from the teeth having radial rake angles of 12° by 3°. However, it does not differ at all from the other tooth having an identical value of 9°. It can now be understood that the tooth having a radial rake angle value of 9°, has a radial rake angle value which differs by at least 2° (in this case differing by exactly 3°) from all other teeth with non-identical radial rake values (i.e. this statement thereby excludes the one other tooth having an identical value of 9°).

Such feature is thought to particularly allow difficult to achieve deep shouldering, successfully tested at 4D but believed to be possible to be feasible at up to, and perhaps even more than 6D.

The deep shouldering capability is believed to be assisted by other design features such as the index angle arrangement which on the one hand comprises different index values to reduce vibration and on the other hand converges towards equality at the center of the end mill and diverges again to not detrimentally space the teeth.

A similar design contribution can be understood by the helix variance being tightly restricted to a close set of values (in this case the variance being a total of 3° between all flutes). While varying helix angles benefits vibration reduction, this variance was restricted to produce an end mill with a particularly long effective cutting length, and was subsequently compensated with a relatively larger radial rake variance (radial rake variation typically being believed to be less effective in reducing vibration than helix variation).

Similar to other factors (e.g. the radial rake angles, helix angles, index angles), the flute depths are also varied to reduce vibration, but again within a limited amount to not detriment the end mill.

Yet another design feature incorporated to reduce vibration was to vary tooth width (i.e. provision of different relief surface widths). Tooth widths are typically configured to be as large as possible to provide necessary strength for a cutting action and reduction of a tooth width could therefore easily be considered detrimental. Nonetheless, to reduce vibration this variation was incorporated and offset by reducing the relief surface widths only on teeth with larger tooth areas.

The description above includes an exemplary embodiment which does not exclude non-exemplified embodiments from the claim scope of the present application.

What is claimed is:

1. A finish end mill configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising:
   a shank portion; and
   a cutting portion extending forward from the shank portion to a cutting end face;
the cutting portion comprising:
   a diameter $D_E$;
   an effective cutting length $L_E$; wherein the effective cutting length $L_E$ is greater than $2.5D_E$;
   five or more integrally formed teeth; and
   flutes alternating with the five or more teeth, each flute having a helix angle and a flute depth;
each tooth comprising:
   a rake surface;
   a relief surface succeeding the rake surface and having a relief surface width measurable in a plane perpendicular to the rotation axis ($A_R$);
   a cutting edge formed at an intersection of the rake and relief surfaces;
   a relief edge spaced apart from the cutting edge and formed at an intersection of the relief surface and a flute surface of the flute succeeding the tooth; and
   a tooth area defined between a first radial line extending from the cutting edge to the central rotation axis and a second radial line extending from the central rotation axis to a nadir of the succeeding flute;
wherein at an axial location in a front half of the effective cutting length:
   the flutes have an average helix angle value, with one or more flutes having a smallest helix angle value, and one or more flutes having a largest helix angle value;
   the flutes have a helix angle variance of 6° or less;
   the teeth have an average radial rake angle value, with one or more teeth having a smallest radial rake angle value, and one or more teeth having a largest radial rake angle value;
   at least three of the five or more teeth have different radial rake angles; and
   at least some of the different radial rake angle values being different from all other non-identical values by 2° or more.

2. The finish end mill according to claim 1, wherein, at an axial location in the front half of the effective cutting length:
   the teeth have an average tooth area value, with one or more teeth having a smallest tooth area value, and one or more teeth having a largest tooth area value;
   the teeth have an average relief surface width value, with one or more teeth having a smallest relief surface width value, and one or more teeth having a largest relief surface width value; and
   at least one tooth has a tooth area greater than the average tooth area value and a relief surface width smaller than the average relief surface width value.

3. The finish end mill according to claim 1, wherein, at an axial location in the front half of the effective cutting length:
   at least one tooth has a radial rake angle smaller than the average radial rake angle value; and
   the flute preceding each such tooth has a helix angle larger than the average helix angle value.

4. The finish end mill according to claim 3, wherein, at an axial location in a front half of an effective cutting length:
   each of at least two teeth has a radial rake angle smaller than the average radial rake angle value; and
   said flute preceding each such tooth has a helix angle larger than the average helix angle value.

5. The finish end mill according to claim 3, wherein, at an axial location in a front half of an effective cutting length:
   said at least one tooth has a radial rake angle smaller than the average radial rake angle value; and
   said flute preceding each such tooth has a helix angle equal to the largest helix angle value.

6. The finish end mill according to claim 5, wherein, at an axial location in a front half of an effective cutting length:
   said at least one tooth has a radial rake angle equal to the smallest radial rake angle value.

7. The finish end mill according to claim 3, wherein, at an axial location in a front half of an effective cutting length:
   each tooth with a radial rake angle equal to the smallest radial rake angle value is preceded by a flute with a helix angle larger than the average helix angle value.

8. The finish end mill according to claim 7, wherein, at an axial location in a front half of an effective cutting length:
   each tooth with a radial rake angle equal to the smallest radial rake angle value is preceded by a flute with a helix angle equal to the largest helix angle value.

9. The finish end mill according to claim 1, wherein, at an axial location in a front half of an effective cutting length:
   a majority of flutes have a helix angle larger than the average helix angle value, and
   each of said majority of flutes is succeeded by a tooth having a radial rake angle smaller than the average radial rake angle value.

10. The finish end mill according to claim 1, wherein, at an axial location in a front half of an effective cutting length:
    at least one tooth has a radial rake angle which is equal to the largest radial rake angle value; and
    the flute preceding each such tooth has a helix angle which is smaller than the largest helix angle value and larger than the smallest helix angle value.

11. The finish end mill according to claim 1, wherein at an axial location in a front half of an effective cutting length:
    at least one tooth has a radial rake angle greater than the average radial rake angle value; and
    the flute preceding each such tooth has a helix angle smaller than the average helix angle value.

12. The finish end mill according to claim 1, wherein at an axial location in the front half of the effective cutting length:
    successive flutes have different helix angles which vary by 3° or less.

13. The finish end mill according to claim 1, wherein at an axial location in the front half of the effective cutting length:

each radial rake angle value is different from all other non-identical values in accordance with the condition: 3°±1°.

14. The finish end mill according to claim 1, wherein the effective cutting length $L_E$ is less than $6D_E$.

15. The finish end mill according to claim 1, wherein the effective cutting length $L_E$ fulfills the condition: $L_E=4D_E\pm 1D_E$.

16. The finish end mill according to claim 1, wherein, in a rearward direction from the cutting end face, index angles between each adjacent pair of cutting edges in cross-sections of the cutting portion approach equality and subsequently diverge therefrom.

17. The finish end mill according to claim 16, wherein said index angles approach equality with increasing proximity to a middle of the effective cutting length.

18. The finish end mill according to claim 1, wherein the diameter $D_E$ of the end mill has a constant value throughout the effective cutting length.

19. The finish end mill according to claim 1, wherein the five or more teeth is equal to or less than 11 teeth.

20. The finish end mill according to claim 19, wherein the five or more teeth is equal to 5, 7 or 9 teeth.

21. The finish end mill according to claim 1, wherein all of said five or more teeth are smooth.

22. The finish end mill according to claim 1, wherein the flutes have a helix variance of 4° or less.

23. The finish end mill according to claim 1, wherein all helix angles are within the range of 35° to 41°.

24. The finish end mill according to claim 1, wherein the flutes have at least three different helix angles, at an axial location in a front half of the effective cutting length.

25. The finish end mill according to claim 24, wherein at least one flute has a helix angle equal to the average helix angle, at an axial location in a front half of the effective cutting length.

26. A finish end mill configured for rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising:
    a shank portion; and
    a cutting portion extending forward from the shank portion to a cutting end face;
the cutting portion comprising:
    an effective cutting length $L_E$;
    a diameter $D_E$;
    exactly 5, 7 or 9 integrally formed teeth; and
    flutes alternating with the exactly 5, 7 or 9 integrally formed teeth, each flute having a helix angle and a flute depth;
each tooth comprising:
    a rake surface;
    a relief surface succeeding the rake surface and having a relief surface width measurable in a plane perpendicular to the rotation axis ($A_R$);
    a cutting edge formed at an intersection of the rake and relief surfaces;
    a relief edge spaced apart from the cutting edge and formed at an intersection of the relief surface and a flute surface of the flute succeeding the tooth; and
    a tooth area defined between a first radial line extending from the cutting edge to the central rotation axis and a second radial line extending from the central rotation axis to a nadir of the succeeding flute;
wherein at an axial location in a front half of the effective cutting length:
    the flutes have an average helix angle value, with one or more flutes having a smallest helix angle value, and one or more flutes having a largest helix angle value;
    the flutes have a helix angle variance of 6° or less;
    the teeth have an average radial rake angle value, with one or more teeth having a smallest radial rake angle value, and one or more teeth having a largest radial rake angle value;
    at least three of the integrally formed teeth have different radial rake angles; and
    at least some of the different radial rake angle values being different from all other non-identical values by 2° or more.

27. The finish end mill according to claim 26, wherein the flutes have at least three different helix angles, at an axial location in a front half of the effective cutting length.

28. The finish end mill according to claim 26, wherein at least one flute has a helix angle equal to the average helix angle, at an axial location in a front half of the effective cutting length.

* * * * *